(12) United States Patent
Elsen et al.

(10) Patent No.: US 8,665,747 B2
(45) Date of Patent: Mar. 4, 2014

(54) PREVENTING LOOPS ON NETWORK TOPOLOGIES BUILT WITH VIRTUAL SWITCHES AND VMS

(75) Inventors: Christian Elsen, Rolle (CH); Maurizio Portolani, Rolle (CH)

(73) Assignee: Cisco Technology, Inc., San Jose, CA (US)

( * ) Notice: Subject to any disclaimer, the term of this patent is extended or adjusted under 35 U.S.C. 154(b) by 912 days.

(21) Appl. No.: 12/630,637

(22) Filed: Dec. 3, 2009

(65) Prior Publication Data

US 2011/0134793 A1   Jun. 9, 2011

(51) Int. Cl.
*H04L 12/28* (2006.01)
*G06F 9/455* (2006.01)
*G06F 9/46* (2006.01)

(52) U.S. Cl.
USPC .......... 370/254; 370/395.53; 718/1; 718/100; 718/108

(58) Field of Classification Search
None
See application file for complete search history.

(56) References Cited

U.S. PATENT DOCUMENTS

| | | | |
|---|---|---|---|
| 2004/0025158 A1* | 2/2004 | Traut | 718/1 |
| 2008/0117909 A1* | 5/2008 | Johnson | 370/392 |
| 2009/0119684 A1* | 5/2009 | Mahalingam et al. | 719/324 |
| 2009/0190477 A1* | 7/2009 | Osborne | 370/237 |
| 2010/0014526 A1* | 1/2010 | Chavan et al. | 370/395.53 |
| 2011/0022695 A1* | 1/2011 | Dalal et al. | 709/222 |

* cited by examiner

*Primary Examiner* — Hassan Phillips
*Assistant Examiner* — Lonnie Sweet
(74) *Attorney, Agent, or Firm* — Patterson & Sheridan, LLP

(57) ABSTRACT

A method and apparatus is disclosed for preventing loops on a network topology which includes virtual switches and virtual machines. For example, a virtualization management application may prevent loops from being introduced into a network topology where a virtual machine forwards traffic between any two (or more) virtual network interface cards (vNICs). A method to prevent loops may include receiving a request to create a virtual network interface (vNIC) for a virtual machine (VM) instance on a computing system, and in response to determining that the requested vNIC is to be connected to the same network segment as an existing vNIC of the VM instance, failing the request to generate the requested vNIC.

20 Claims, 4 Drawing Sheets

PREVENTING LOOPS ON NETWORK TOPOLOGIES BUILT WITH VIRTUAL SWITCHES AND VMS

TECHNICAL FIELD

Embodiments described in this disclosure generally relate to virtualized computer networks. More particularly, described embodiments relate to methods and apparatus for preventing loops on network topologies built with virtual switches and virtual machines.

BACKGROUND

Computer virtualization techniques provide a rich set of networking capabilities that integrate well with sophisticated enterprise networks. Virtual networking allows users to network virtual machines in the same manner as physical machines. Thus, users can build complex networks within a single physical server host or across multiple server hosts. Virtual switches allow virtual machines on the same server host to communicate with each other using the same protocols used over physical switches, without the need for additional networking hardware. Further, virtual switches support virtual LANs (VLANs) that are compatible with standard VLAN implementations from a variety of networking and virtualization vendors. A virtual machine can be configured with one or more virtual Ethernet adapters (vNIC), each of which each has its own MAC address. As a result, virtual machines have properties similar to those of physical machines, from a networking standpoint. In addition, virtual networks enable functionality not possible with physical networks.

Thus, virtual server environments use software based virtual switches inside a virtual server to enable communication among the virtual machines (VM) as well as between VMs and the outside world. The virtual switches are typically designed to not introduce loops in the network. They achieve this result without using a spanning-tree protocol; instead virtual switches use a combination of pinning VMs to a given physical NIC (MAC pinning) and a distance vector logic whereby a frame received by a virtual switch coming from outside into the physical server is not forwarded back to another physical NIC. This approach, however, assumes that the VMs operate as a computing node or an end-point destination and not as a networking node (e.g., a firewall or other networking appliance).

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1:
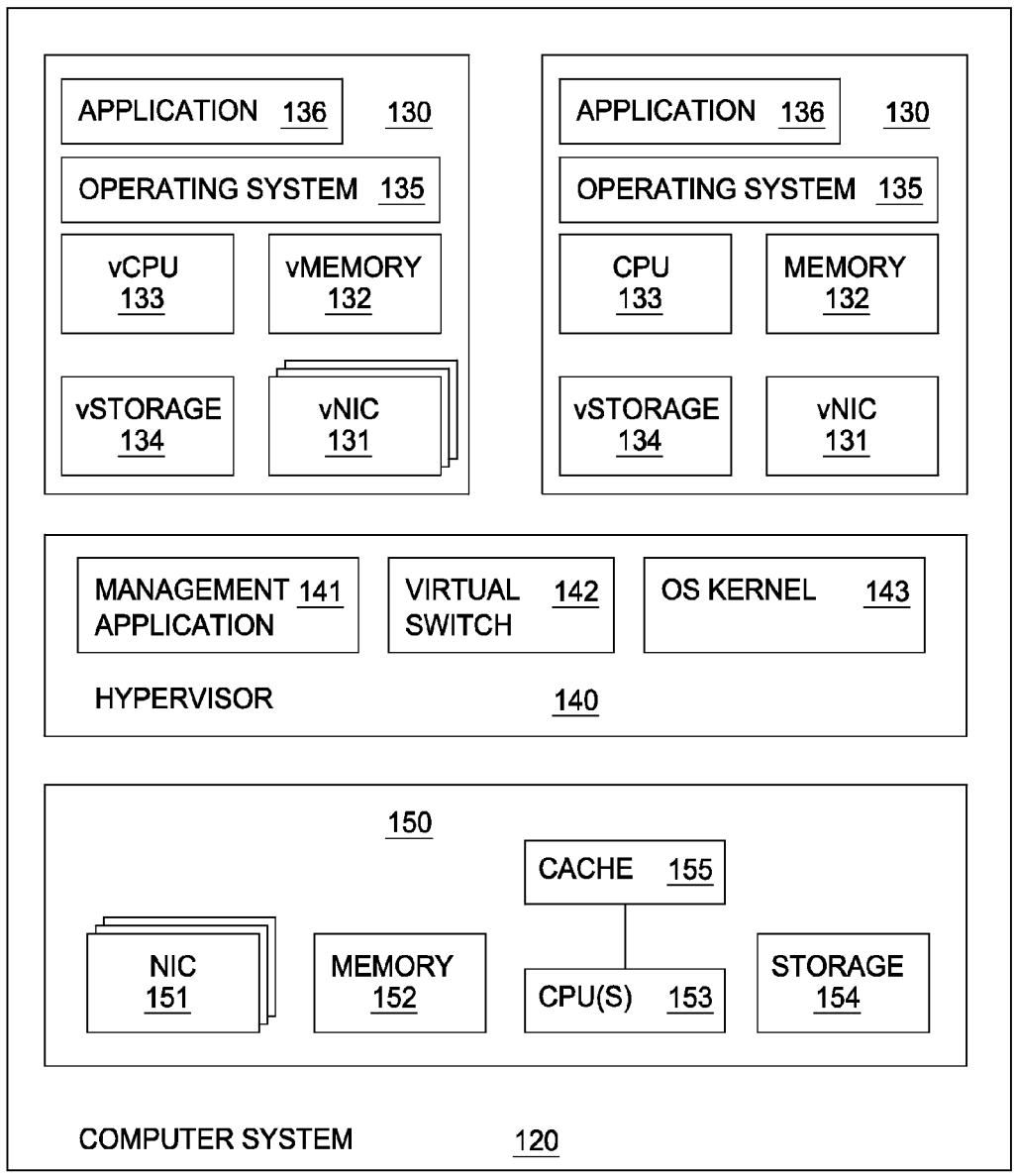
FIG. 1 is a block diagram illustrating a computer server hosting multiple virtual machines, according to one embodiment.

Embodiments of the present disclosure provide techniques to prevent loops on network topologies which include virtual switches and virtual machines. For example, embodiments described herein protect against loops being introduced into a network topology where a virtual machine forwards traffic between any two (or more) virtual network interface cards (vNICs). One embodiment described herein includes a method for preventing loops on network topologies built with virtual switches and virtual machines. The method may generally include receiving a request to create a vNIC for a VM instance on a computing system. In response to determining that the VM instance does not include an existing vNIC, the requested vNIC is created. Otherwise, in response to determining that the VM instance includes one or more existing vNICs, the method includes determining whether the requested vNIC is to be connected to a same network segment as one of the existing vNICs of the VM instance. In response to determining that the requested vNIC is to be connected to the same network segment as one of existing vNICs of the VM instance, the request to generate the requested vNIC is failed.

In a particular embodiment, the VM instance operates as a networking appliance to bridge a first virtual local area network (VLAN) segment and a second VLAN segment. For example, the VM instance may operate as a layer 2 firewall appliance. Further, the request to create the vNIC may be associated with a request to create the VM instance. Alternatively, the request to create the vNIC may be received as a request to add the vNIC to an instantiated VM instance.

DESCRIPTION OF EXAMPLE EMBODIMENTS

Embodiments of the present disclosure provide techniques to prevent loops on network topologies which include virtual switches and virtual machines. For example, embodiments described herein protect against loops being introduced into a network topology where a virtual machine forwards traffic between any two (or more) virtual network interface cards (vNICs). That is, where the virtual machine does not operate in the end-host, but acts as a network appliance. For example, the virtual machine may operate as a firewall connecting an untrusted VLAN segment to a trusted one. In such a case, one vNIC may connect the VM (operating as the firewall) to the untrusted segment and a second vNIC may connect it to the trusted segment.

When a second physical connection between a end-host or a network appliance and layer 2 segment increases the network bandwidth available to the host/appliance as well as allows for load balancing and redundancy. Further, in such a case, the physical network hardware may be configured to use a spanning tree protocol to cut loops in the network topology. In contrast, adding a second vNIC to a VM does not provide additional bandwidth or redundancy between that VM and a given VLAN segment. Further, spanning tree does not prevent loops when a host (regardless of whether the host is a physical server or a virtual machine) forwards traffic between two physical (or virtual) NICs. This occurs because hosts do not typically forward Bridge Protocol Data Units (BPDUs) and spanning tree protocol (STP) relies on BPDUs to ensure a loop-free topology for bridged LANs. Further, virtual switch implementations do not typically perform the spanning tree protocol because of how taxing spanning tree is on a host (server) control plane. As a result, spanning tree protocol does not prevent loops where a VM forwards Layer 2 traffic to two (or more) virtual network adapters connected to the same VLAN.

In one embodiment, a hypervisor managing multiple virtual machine (VM) instances on a computer system may be configured to prevent an instance of a virtual machine from being created with multiple vNICs connected to the same VLAN segment. Similarly, the hypervisor may prevent a vNIC from being added to an existing VM (or a vNIC configuration from being modified) where doing so results in multiple connections to the same VLAN segment. This may include preventing multiple vNICs from being connected to the same VLAN where the VLAN is presented to virtual machines using two or more distinct port-group names (which may lead an administrator to conclude that the VM is actually connecting to different VLANs).

This disclosure references various embodiments. However, it should be understood that this disclosure is not limited to embodiments described herein. Instead, any combination of the following features and elements, whether related to different embodiments or not, is contemplated to implement and practice an embodiment. Furthermore, in various embodiments, embodiments provide numerous advantages over the prior art. However, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim Additionally, application programs disclosed herein may be distributed on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. For example, as described herein, one embodiment includes a computer-readable storage medium containing a program, which when executed on a processor is configured to perform an operation for preventing loops on network topologies built with virtual switches and virtual machines. Other media include communications media through which information is conveyed to a computer, such as through a computer or telephone network, including wireless communications networks.

FIG. 1 is a block diagram illustrating a computer system 120 hosting multiple virtual machines 130, according to one embodiment. As shown, the computer system 120 generally includes system hardware 150, such as one or more network interface cards (NICs) 151, a memory 152, CPU(s) 153 and a storage device 154. The hypervisor 140, also known as a virtual machine monitor (VMM), generally runs over the system hardware 150 and allows the system hardware 150 to host multiple virtual machines 130 (sometimes referred to as guest systems). A cache 155 provides a high-speed memory accessed by the CPU 153. While memory 152 can be segmented across virtual machines 130, cache 155 is often shared, i.e., each virtual machine may be have a more-or-less dedicated partition of memory 152 (mapping to virtual memory 132).

In one embodiment, the hypervisor 140 may be implemented as a software layer that runs directly on the system hardware 150 where an OS kernel 143 intercepts some, or all, operating system calls to the system hardware 150. In some embodiments, the hypervisor 140 virtualizes CPU 153 and memory 152, while a single privileged guest virtual machine manages and virtualizes network traffic and storage I/O. That is, the host (one of the virtual machines 130) is also tasked with performing as a management system for some aspects of the virtualized system. The host generally runs using a specially privileged kernel (OS 135) that can access system hardware 150 and can create/modify/destroy virtual machines 130.

Illustratively, the hypervisor 140 includes a management application 141, a virtual switch 142 and an operating system kernel 143. The management application 141 may allow users to create and manage instances of the virtual machines 130. As part of creating a VM instance, the user may specify a configuration for the virtual CPU 133, virtual memory 132 and virtual storage 134. Further, the user may specify networking components (e.g., one or more vNICs 131) to include in a VM instance, as well as network configuration settings for the VM instance, e.g., an IP address, an Ethernet MAC address, as well as specify a network configuration, e.g., a connection between a given vNIC 131 and a virtual switch 142. In turn, the virtual switch 142 may act as a networking device for multiple VM instances 130, allowing network traffic to flow from an application 136 executing on one of the virtual machines 130 to another using the same network protocols that would be used if such applications were executing on distinct physical machines and connected to a physical switch.

As shown, virtualization allows multiple virtual machines 130 to run simultaneously on the computer system 120, sharing the system hardware 150. However, the virtual machines 130 are not generally aware of the system hardware 150 directly. Instead, the hypervisor 140 provides a collection of virtual hardware for each virtual machine 130. As shown in FIG. 1, e.g., each virtual machine includes a virtual CPU 133, a virtual memory 132, one or more virtual network interfaces 131 and virtual storage 134. Similarly, each virtual machine 130 runs an operating system (OS) 135 on the virtual hardware (131-134) exposed by the hypervisor 140. Together, the virtual hardware (131-134) and operating system 136 provide a virtualized computing platform for applications 136. Note, while these virtual hardware allocations appear distinct to the OS 135 and applications 136 running on each virtual machine 130, often they are either shared or contend for some shared resource below the virtualization layer. That is, the virtual resources provide an abstraction for the underlying physical resources—and the underlying physical resources are shared among the virtual machines 130.

Additionally, in one embodiment, one of the applications 136 may be a network application or appliance (e.g., a firewall) configured to evaluate and forward layer 2 network traffic (e.g., Ethernet frames). In such a case, traffic received over one vNIC 131 may be forwarded back towards virtual switch 142 over another vNIC 131. Further, a management application 141 running as part of the hypervisor 140 may be configured to prevent a configuration for such a virtual machine 130 where multiple vNICs 131 are connected to the same VLAN segment.

Figure 2:
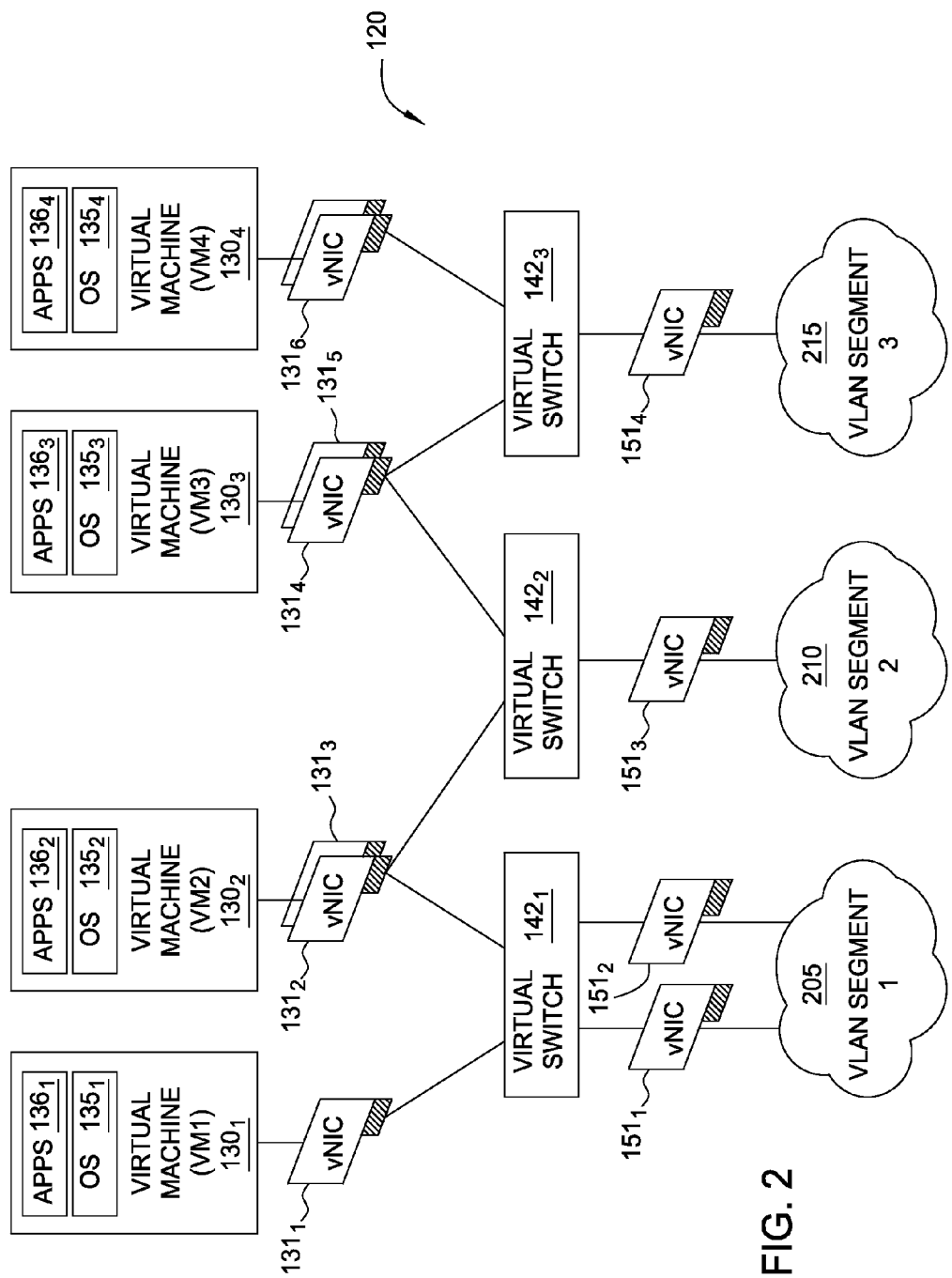
FIG. 2 illustrates an example network topology within a computer server hosting multiple virtual machines, according to one embodiment.

FIG. 2 illustrates an example network topology within a computer system hosting multiple virtual machines, according to one embodiment. In this example, four virtual machines $130_{1-4}$ have been instantiated on computer system 120 and each is running an operating system (OS) $135_{1-4}$ and applications $136_{1-4}$. Additionally, each virtual machine $130_{1-4}$ includes one or more virtual NIC (vNICs) 131. For example, vNIC $131_1$ connects virtual machine $130_1$ to virtual switch $142_1$. Similarly, vNIC $131_2$ connects virtual machine $130_2$ to virtual switch $142_1$. Virtual switch $142_1$ also includes a connection to two physical NICs $151_{1-2}$, linking virtual switch $142_1$ with VLAN segment 205. That is, physical NICs $151_{1-2}$ bridge the connection between the virtual network topology within the computer system 120 and a physical network infrastructure (i.e., with VLAN segment 205).

Virtual machine $130_2$ also includes vNIC $131_3$, connecting it to virtual switch $142_2$ and physical NIC $151_3$. In turn, NIC $151_3$ is connected to VLAN segment 210. Illustratively, virtual machine $130_3$ also includes two vNICS $130_{4-5}$. The vNIC $131_4$ connects virtual machine $130_3$ to virtual switch $142_2$ and vNIC $131_5$ connects virtual machine $130_4$ to virtual switch $142_3$. Lastly, virtual machine $130_4$ includes a vNIC $131_6$ connecting it to virtual switch 142, itself connected to physical NIC $151_4$ (and VLAN segment 215).

Figure 3A:
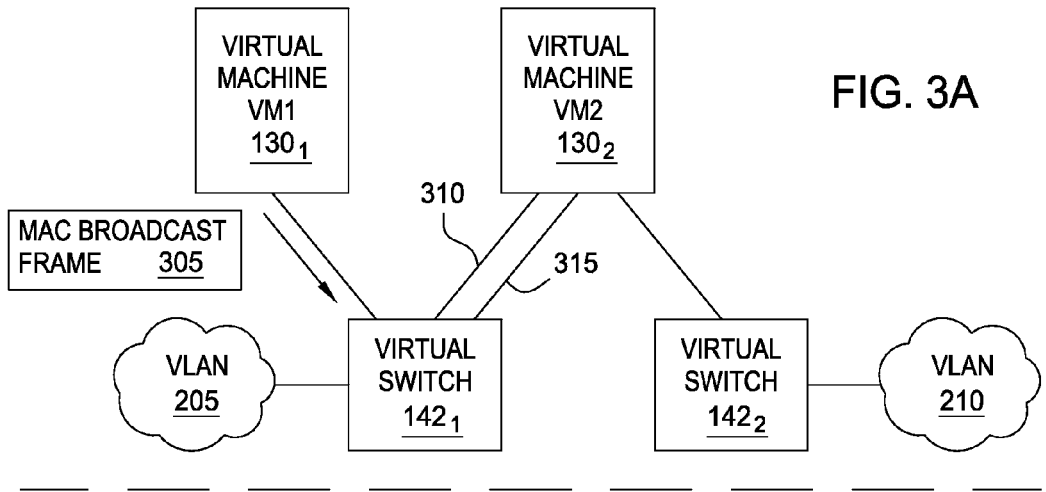
FIGS. 3A-3C illustrate an example of a network topology built with virtual switches and virtual machines which may result in looping network frames, according to one embodiment.
Figure 3B:
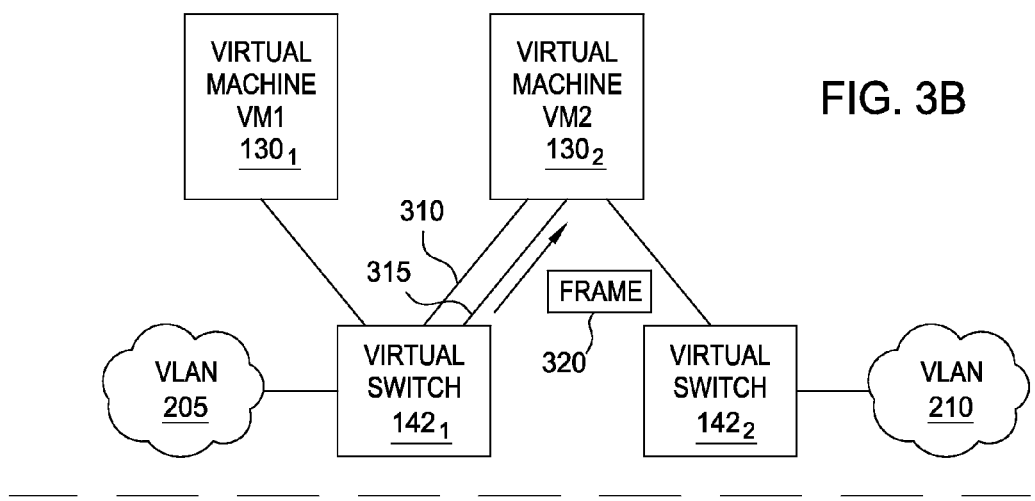
Figure 3C:
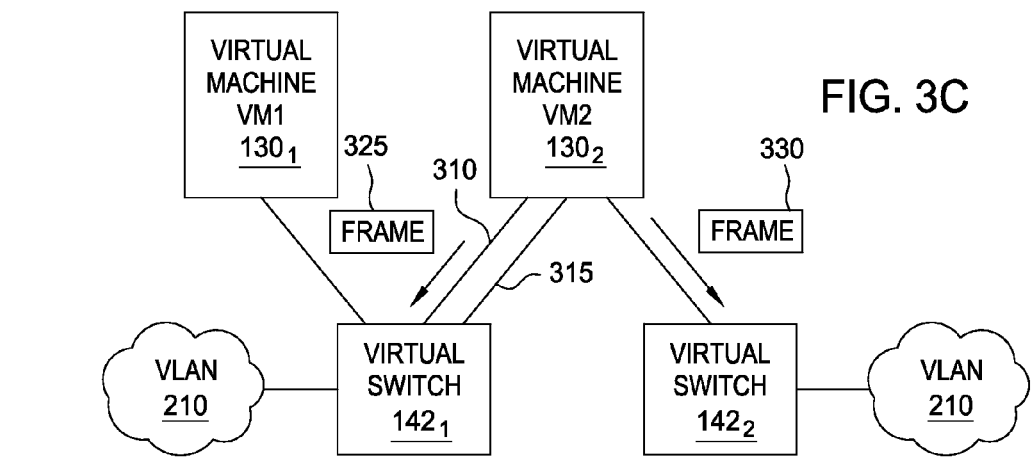

For this example, assume that the application $136_2$ on virtual machine $130_2$ is a firewall configured to permit certain traffic received over vNIC $131_2$ (from virtual switch $142_1$ and VLAN segment 205) to be forwarded out over vNIC $131_3$ towards VLAN segment 210. That is, application $136_2$ acts as a network bridge between VLAN segment 205 and VLAN segment 210. Note, while the virtual machine $130_2$ includes two vNICS ($131_{2-3}$), each is connected to a distinct VLAN (i.e., VLAN segments 205 and 210). Thus, no loops are present in the network topology shown in FIG. 2. In contrast, FIGS. 3A-3C illustrate an example of a network topology built with virtual switches and virtual machines which may result in looping network frames, according to one embodiment. The network topology shown in FIGS. 3A-3C corresponds to the network topology of FIG. 2. However, the configuration of virtual machine $130_2$ is modified to include two vNICs connecting this VM to switch $142_1$—represented in FIGS. 3A-3C as links 310 and 315.

FIG. 3A shows virtual machine $130_1$ forwarding a MAC broadcast frame 305 towards virtual switch $142_1$. As noted, virtual machine $130_2$ includes two links 310, 315 to virtual switch $142_1$. Assume each link 310, 315 is the result of a vNIC created for virtual machine $130_2$ and that an application running on virtual machine $130_2$ acts as a network bridge passing layer 2 frames between VLAN 205 and VLAN 210 (e.g., a firewall).

FIG. 3B shows virtual switch $142_1$ forwarding frame 320 towards virtual machine $130_2$. One of ordinary skill in the art will recognize that virtual switch $142_1$ may forward a broadcast frame over both links 310 and 315. However, for simplicity, frame 320 is shown being sent over link 315. Once received, virtual machine $130_2$ may forward the broadcast frame over each available network link.

This result is shown in FIG. 3C. As shown, the virtual machine $130_2$ forwards broadcast a frame 330 towards virtual switch $142_2$. However, because link 310 is distinct from link 315, virtual machine $130_2$ also forwards a frame 325 towards virtual switch $142_1$ over link 310. Frame 325 completes the loop in this example because, once received by virtual switch $142_1$, the frame is forwarded a second time back towards virtual machine $130_2$. From here, the network simply loops between the state shown in FIG. 3B (where frame 320 is sent from virtual switch $142_1$ to virtual machine $130_2$) and FIG. 3C (where frame 325 is sent from virtual machine $130_2$ to virtual switch $142_1$). Further, because Layer 2 frames do not include any time-to-live (TTL) parameters, the loop just continues indefinitely. Further still, each additional broadcast (or multicast) frame are forwarded towards virtual machine $130_2$ results in another looping frame in this example network topology.

Figure 4:
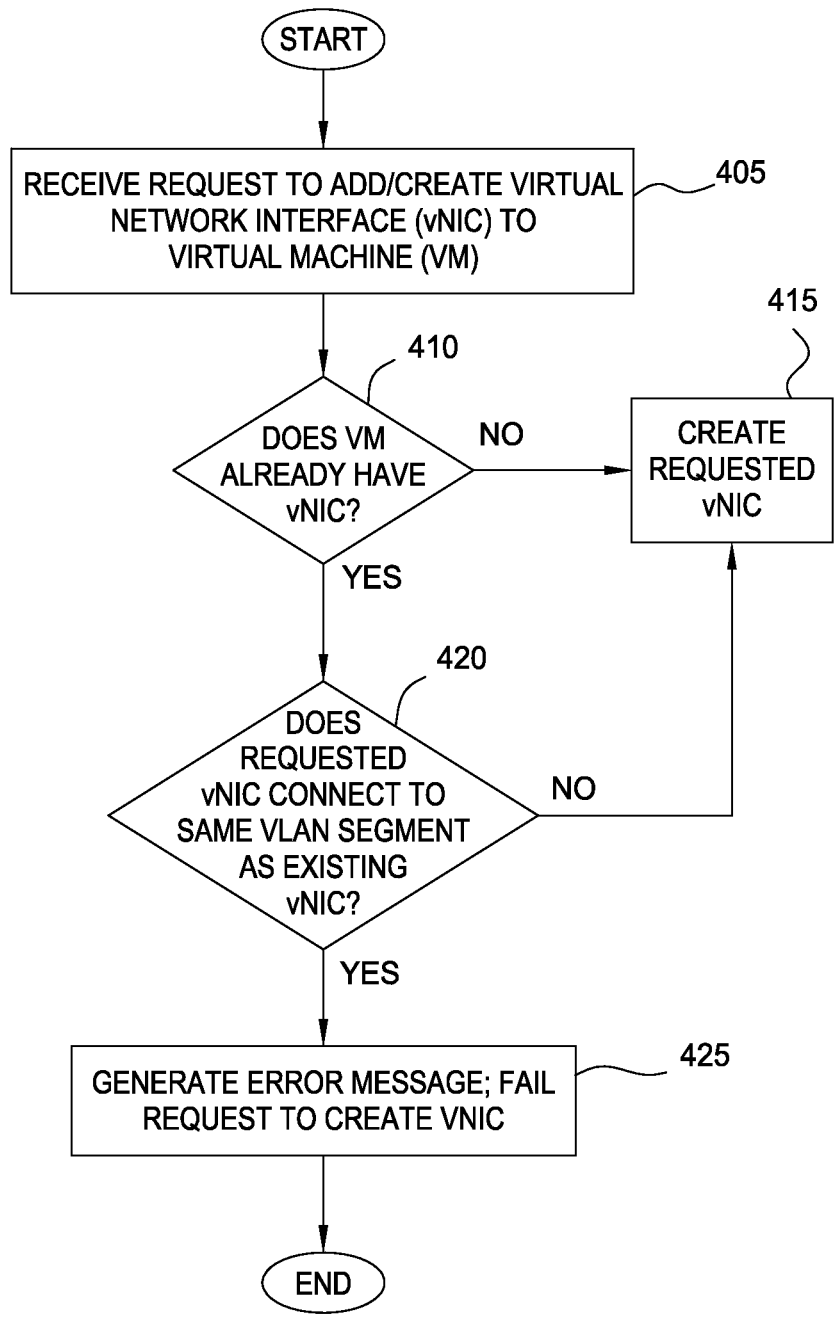
FIG. 4 illustrates a method for preventing loops on network topologies built with virtual switches and virtual machines, according to one embodiment.

FIG. 4 illustrates a method 400 for preventing loops on network topologies built with virtual switches and virtual machines, according to one embodiment. As shown, the method 400 begins at step 405 where the VM management application receives a request to create (or add) a virtual network interface (vNIC) to a virtual machine (VM). For example, a user may be defining a new VM instance to spawn on a virtualized system. In such a case, the user may specify what virtual hardware elements to create for the virtual machine instance (e.g., processor, memory, block storage devices) as well as one or more vNICs. The user may also specify a network configuration for a VM instance, e.g., an IP address and Ethernet MAC address, as well as specify a configuration between a given vNIC 131 and a virtual switch 142 (or a mapping between a vNIC and a physical NIC connected to a VLAN). Alternatively, a user may request to modify the configuration of a virtual machine to add a vNIC to a VM instance (or modify an existing vNIC configuration).

At step 410, the management application may determine whether the VM instance already includes a vNIC. If not, then at step 415 the requested vNIC is created. Otherwise, at step 420, the management application may determine whether the requested vNIC includes a connection to the same VLAN as an existing vNIC. For example, the management application may evaluate the network topology of the existing vNICs in a VM to identify what network segments (e.g., what VLAN segment) each vNIC is attached to. If the requested vNIC does not connect to the same network segment as any existing vNIC, then at step 415, the management application creates the requested vNIC. Otherwise, if the user has requested a network configuration resulting in two vNIC connections to the same network segment, then at step 325, the management application may fail the request to generate a vNIC. Further, in one embodiment, the management application may generate an error message to inform the user that the requested vNIC would result in a network topology prone to looping frames at the Layer 2 level.

Thus, as described, loops may be prevented on network topologies which include virtual switches and virtual machines. For example, loops may be prevented from being introduced into a network topology where a virtual machine forwards traffic between any two (or more) virtual network interface cards (vNICs). That is, where the virtual machine does not operate as an end-host, but acts as a network appliance or bridge between network subnets (e.g., bridging two VLAN segments).

While the foregoing is directed to embodiments of the present disclosure, other and further embodiments of the disclosure may be devised without departing from the basic scope thereof, and the scope thereof is determined by the claims that follow.

The invention claimed is:

1. A computer-implemented method for preventing loops on virtual network topologies, comprising:
   receiving a request to create a virtual network interface (vNIC) for a virtual machine (VM) instance on a computing system;
   in response to determining that the VM instance does not include an existing vNIC, generating the requested vNIC;
   in response to determining that the VM instance includes one or more existing vNICs including a first vNIC, determining whether the request specifies to create a network connection between the requested vNIC and a first virtual network segment connected to the first vNIC; and in response to determining that the request specifies to create the network connection between the requested vNIC and the first virtual network segment, failing the request to generate the requested vNIC to prevent a loop within the VM instance.

2. The method of claim 1, wherein the VM instance operates as a networking appliance to bridge a first virtual local area network (VLAN) segment and a second VLAN segment.

3. The method of claim 2, wherein the appliance is a layer 2 firewall appliance.

4. The method of claim 1, wherein the request to create the vNIC includes a set of network configuration parameters.

5. The method of claim 4, wherein the set of network configuration parameters includes at least a MAC address and an indication of a network connection to create between the requested vNIC and a virtual switch.

6. The method of claim 1, wherein the request to create the vNIC is associated with a request to create the VM instance.

7. The method of claim 1, wherein the request to create the vNIC is received as a request to add the vNIC to an instantiated VM instance, wherein the first vNIC is external to the first virtual network segment.

8. A computing system, comprising:
a processor; and
a memory containing a virtualization program configured to perform an operation for preventing loops on virtual network topologies, the operation comprising:
receiving a request to create a virtual network interface (vNIC) for a virtual machine (VM) instance on a computing system,
in response to determining that the VM instance does not include an existing vNIC, generating the requested vNIC,
in response to determining that the VM instance includes one or more existing vNICs including a first vNIC, determining whether request specifies to create a network connection between the requested vNIC and a first virtual network segment as connected to the first vNIC, and
in response to determining that the request specifies to create the network connection between the requested vNIC and the first virtual network segment, failing the request to generate the requested vNIC to prevent a loop within the VM instance.

9. The system of claim 8, wherein the VM instance operates as a networking appliance to bridge a first virtual local area network (VLAN) segment and a second VLAN segment.

10. The system of claim 9, wherein the appliance is a layer 2 firewall appliance.

11. The system of claim 8, wherein the request to create the vNIC includes a set of network configuration parameters.

12. The system of claim 11, wherein the set of network configuration parameters includes at least a MAC address and an indication of a network connection to create between the requested vNIC and a virtual switch.

13. The system of claim 8, wherein the request to create the vNIC is associated with a request to create the VM instance.

14. The system of claim 8, wherein the request to create the vNIC is received as a request to add the vNIC to an instantiated VM instance, wherein the first vNIC is external to the first virtual network segment.

15. A non-transitory computer readable storage medium, containing a program, which, when executed on a processor prevents loops on virtual network topologies, the program being operable to:
receive a request to create a virtual network interface (vNIC) for a virtual machine (VM) instance on a computing system;
in response to determining that the VM instance does not include an existing vNIC, generate the requested vNIC; and
in response to determining that the VM instance includes one or more existing vNICs including a first vNIC, determining whether the request specifies to create a network connection between the requested vNIC and a first virtual network segment connected to the first vNIC; and
in response to determining that the request specifies to create the network connection between the requested vNIC and the first virtual network segment, failing the request to generate the requested vNIC to prevent a loop within the VM instance.

16. The computer-readable storage medium of claim 15, wherein the VM instance operates as a networking appliance to bridge a first virtual local area network (VLAN) segment and a second VLAN segment.

17. The computer-readable storage medium of claim 16, wherein the appliance is a layer 2 firewall appliance.

18. The computer-readable storage medium of claim 15, wherein the request to create the vNIC includes a set of network configuration parameters including at least a MAC address and an indication of a network connection to create between the requested vNIC and a virtual switch.

19. The computer-readable storage medium of claim 15, wherein the request to create the vNIC is associated with a request to create the VM instance.

20. The computer-readable storage medium of claim 15, wherein the request to create the vNIC is received as a request to add the vNIC to an instantiated VM instance, wherein the first vNIC is external to the first virtual network segment.

* * * * *

UNITED STATES PATENT AND TRADEMARK OFFICE
CERTIFICATE OF CORRECTION

PATENT NO. : 8,665,747 B2  
APPLICATION NO. : 12/630637  
DATED : March 4, 2014  
INVENTOR(S) : Elsen et al.

Page 1 of 1

It is certified that error appears in the above-identified patent and that said Letters Patent is hereby corrected as shown below:

In the Claims:

Column 7, Claim 8, Line 42, please delete "as".

Signed and Sealed this  
Third Day of June, 2014

Michelle K. Lee  
*Deputy Director of the United States Patent and Trademark Office*